(12) United States Patent
Kim et al.

(10) Patent No.: US 9,534,889 B2
(45) Date of Patent: Jan. 3, 2017

(54) WAVELENGTH-SELECTABLE COATING THICKNESS MEASUREMENT APPARATUS

(71) Applicant: Electronics and Telecommunications Research Institute, Daejeon (KR)

(72) Inventors: Jeong Eun Kim, Gwangju (KR); Hyun Seo Kang, Gwangju (KR); Hyoung Jun Park, Gwangju (KR); Young Soon Heo, Gwangju (KR); Keo Sik Kim, Gwangju (KR); Eun Kyoung Jeon, Gwangju (KR); Kwon Seob Lim, Gwangju (KR); Young Sun Kim, Gwangju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 20 days.

(21) Appl. No.: 14/505,747

(22) Filed: Oct. 3, 2014

(65) Prior Publication Data

US 2015/0159997 A1 Jun. 11, 2015

(30) Foreign Application Priority Data

Dec. 10, 2013 (KR) .................. 10-2013-0152913

(51) Int. Cl.
*G01B 11/06* (2006.01)
*G01B 17/02* (2006.01)

(52) U.S. Cl.
CPC ......... *G01B 17/025* (2013.01); *G01B 11/0666* (2013.01)

(58) Field of Classification Search
CPC . G01B 11/06; G01B 11/0616; G01B 11/0675; G01B 9/02014
See application file for complete search history.

(56) References Cited

U.S. PATENT DOCUMENTS

| 5,212,540 | A | * | 5/1993 | Miller | G01B 11/0616 356/631 |
| 6,057,927 | A | | 5/2000 | Levesque et al. | |
| 6,108,087 | A | * | 8/2000 | Nikoonahad | G01B 17/025 356/503 |
| 6,397,680 | B1 | * | 6/2002 | Levesque | G01B 17/025 73/579 |
| 6,445,457 | B1 | * | 9/2002 | Early | G01B 11/0666 356/630 |
| 6,839,496 | B1 | | 1/2005 | Mills et al. | |
| 7,342,665 | B2 | | 3/2008 | Drake, Jr. | |
| 2007/0071389 | A1 | | 3/2007 | Yoon et al. | |

FOREIGN PATENT DOCUMENTS

| KR | 10-0832839 B1 | 5/2008 |
| KR | 10-0946550 B1 | 3/2010 |
| KR | 10-0994037 B1 | 11/2010 |

* cited by examiner

*Primary Examiner* — Jonathan Hansen
(74) *Attorney, Agent, or Firm* — Rabin & Berdo, P.C.

(57) ABSTRACT

Provided is an apparatus that measures a thickness of a coating by selecting a wavelength of a laser based on a color of the coating using a contactless method using a photoacoustic effect and an interferometer, the apparatus including a pulsed laser source to irradiate a pulsed laser beam toward the coating, a continuous wave (CW) laser source to irradiate a CW laser beam toward the coating, a detector to detect an optical interference signal corresponding to the CW laser beam, and a signal processor to process the optical interference signal to calculate a thickness of the coating.

10 Claims, 7 Drawing Sheets

<WHITE>

<BLACK>

<RED>

WAVELENGTH-SELECTABLE COATING THICKNESS MEASUREMENT APPARATUS

CROSS-REFERENCE TO RELATED APPLICATION

This application claims the benefit of Korean Patent Application No. 10-2013-0152913, filed on Dec. 10, 2013, in the Korean Intellectual Property Office, the disclosure of which is incorporated herein by reference.

BACKGROUND

1. Field of the Invention

Embodiments of the present invention relate to an apparatus that measures a thickness of a coating applied on a surface of an object, and more particularly, to an apparatus that measures a thickness of a coating by selecting a wavelength of a laser based on a color of the coating using a contactless method using a photoacoustic effect and an interference signal, rather than an existing contact method.

When a pulsed laser having a nanosecond pulse width is applied to a surface of the coating, an ultrasonic wave may be generated on the surface of the coating and thus, the surface of the coating may be displaced and an optical interference signal may be changed. By measuring the changed optical interference signal, the thickness of the coating may be measured.

To achieve an efficient photoacoustic effect, a pulsed laser having a wavelength band that is excellently absorbed into the coating may be used. To measure an optical interference signal with an excellent sensitivity, a continuous wave (CW) laser having a wavelength band that is excellently reflected by the coating may be used. Since an absorptivity and a reflectivity of the coating vary depending on a color of the coating, lasers having different wavelengths may be used based on the color of the coating. Provided is a wavelength-selectable coating thickness measurement apparatus that may include CW lasers and pulsed lasers having a number of wavelength bands, and select a laser having a desired wavelength band. In another example, provided is a wavelength-selectable coating thickness measurement apparatus that may configure a sensor head unit including a single pulsed laser and a single CW laser, and replace the sensor head unit based on a color of the coating.

2. Description of the Related Art

Coating thickness measurement apparatuses currently being used for vessels, aircrafts, and automobiles may be classified based on measurement principles into a radiographic coating thickness measurement apparatus, an ultrasonic coating thickness measurement apparatus, an eddy current coating thickness measurement apparatus, and a magnetic induction coating thickness measurement apparatus. A method using radiation may detect a defect in transmissive and reflective manners using an X-ray or a gamma ray. The method using radiation may have an advantage of contactless measurement and a disadvantage of harmfulness of radiation to a user. A method using an ultrasonic wave may measure a thickness by measuring a travelling time of an ultrasonic wave transmitted to a sample, reflected, and returned. The method using an ultrasonic wave may require a medium to be used for impedance matching between an ultrasonic transducer and the sample and thus, an application of the method using an ultrasonic wave to a contactless measurement method may be difficult. An eddy current method may measure a thickness based on a change in resistance of an electrode caused by eddy current. A magnetic induction method may measure a thickness by measuring an increase in voltage and an increase in magnetic flux. The magnetic induction method may have an advantage of portability and a disadvantage of contact measurement. Since such a contact measurement apparatus may perform measurement after a covering is completely dried, a great deal of time and expenses may be used to provide dry air for a long time.

In a case of contactless covering thickness measurement using light, the measurement may be performed in real time during a continuous process. Thus, the period of ship constructions may be reduced, and the measurement may be performed rapidly and precisely based on characteristics of light.

An absorption spectrum and a reflection spectrum of a laser may vary depending on a color of a coating. Thus, different wavelengths may be selected for a pulsed laser and a CW laser based on the color of the coating. When a color of a coating to be measured is determined, a pulsed laser having a high-absorptivity wavelength band may be selected to produce an excellent photoacoustic effect, and a CW laser, to be used for an optical interferometer, having a high-reflectivity wavelength band may be selected to be excellently reflected on a surface of the coating.

By integrally including pulsed lasers and CW lasers having different wavelengths in a single measurement apparatus, or by housing pulsed lasers and CW lasers having different wavelengths in an individual module and replacing the module based on a color of a coating, thicknesses of coatings in many colors may be measured using a single measurement apparatus.

SUMMARY

An aspect of the present invention provides a coating thickness measurement apparatus that may measure a thickness of a coating using light in a contactless manner, and measure the thickness of the coating efficiently and precisely by disposing pulsed lasers and continuous wave (CW) lasers having different wavelengths in the single measurement apparatus and selecting a different wavelength based on a color of the coating.

According to an aspect of the present invention, there is provided a coating thickness measurement apparatus including a pulsed laser light source to irradiate a pulsed laser beam toward a coating, a CW laser light source to irradiate a CW laser beam toward the coating, a detector to detect an optical interference signal corresponding to the CW laser beam, and a signal processor to process the optical interference signal to calculate a thickness of the coating.

The optical interference signal may be changed due to an ultrasonic wave generated in the coating by irradiating a pulsed laser.

The detector may detect an optical interference signal before the pulsed laser is irradiated, and an optical interference signal changed after the pulsed laser is irradiated.

The apparatus may further include an output unit to display the thickness of the coating calculated based on a change in the optical interference signal.

The apparatus may further include a laser controller to control a wavelength of the to pulsed laser light source and a wavelength of the CW laser light source to be selectively switched based on color information of the coating input by a user.

The laser controller may control the wavelength of the pulsed laser light source based on an absorptivity of the color information of the coating, and control the wavelength of the CW laser light source based on a reflectivity of the color information of the coating.

The coating thickness measurement apparatus may operate in a contactless manner.

The pulsed laser light source and the CW laser light source may be configured to be a single sensor head unit, and the sensor head unit may be replaceable.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1A:
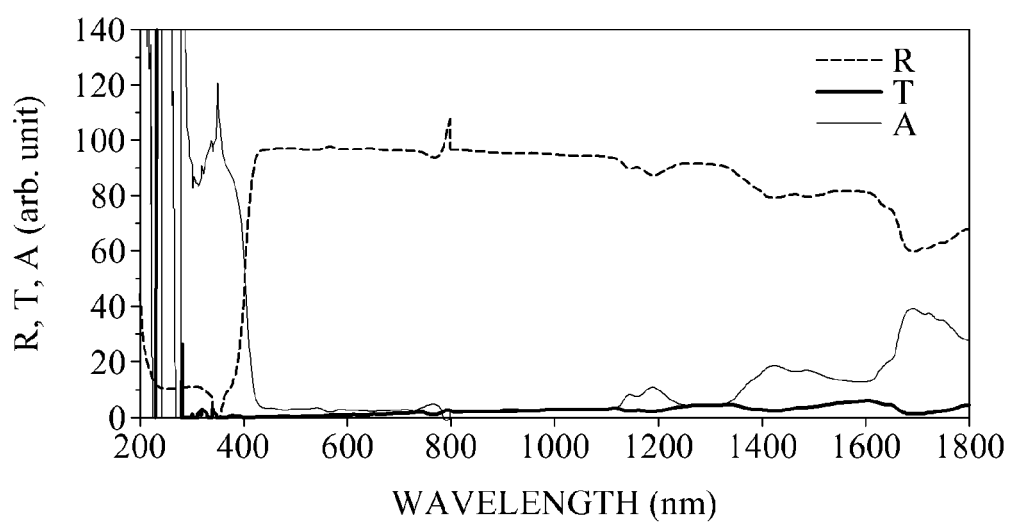
FIGS. 1A through 1D are graphs illustrating reflection spectrums, transmission spectrums, and absorption spectrums of colors of a coating, respectively, according to an embodiment of the present invention.
Figure 1B:
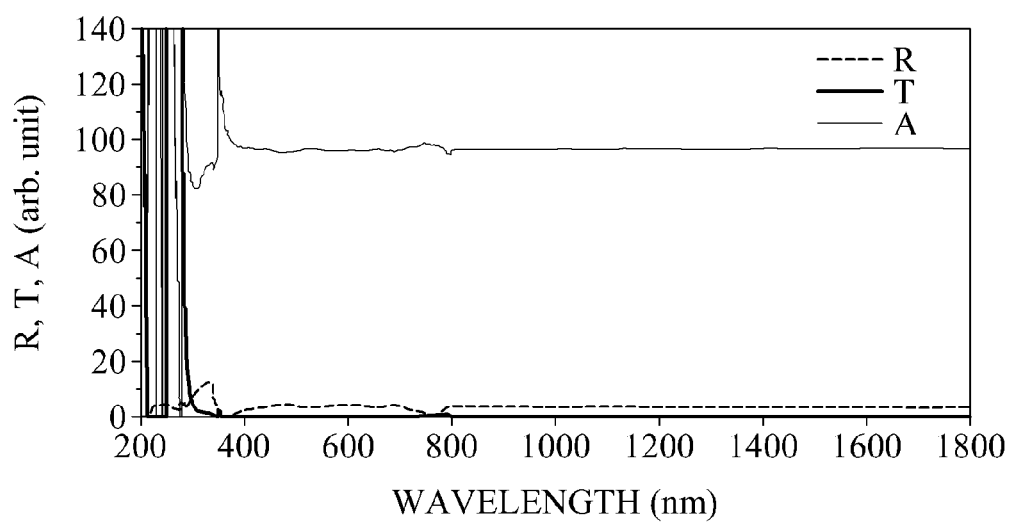
Figure 1C:
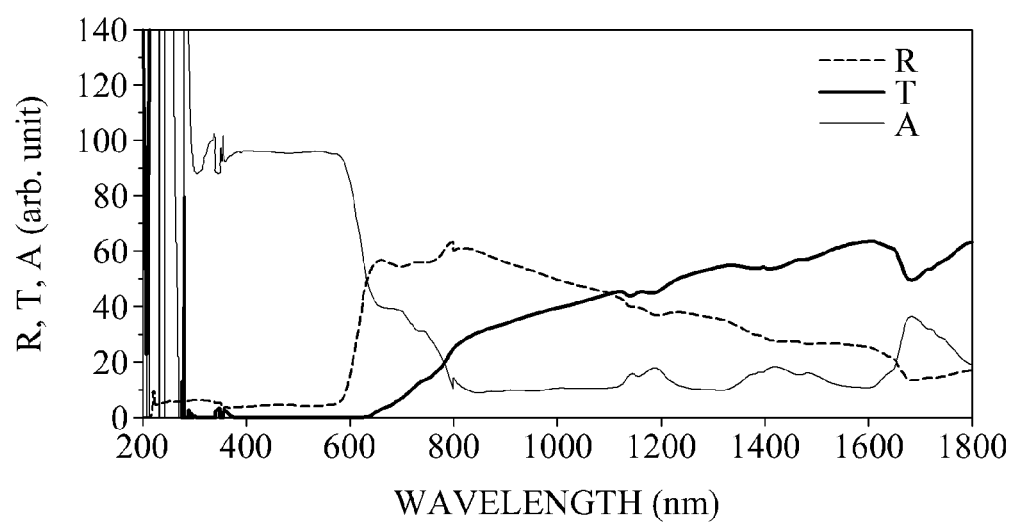
Figure 1D:
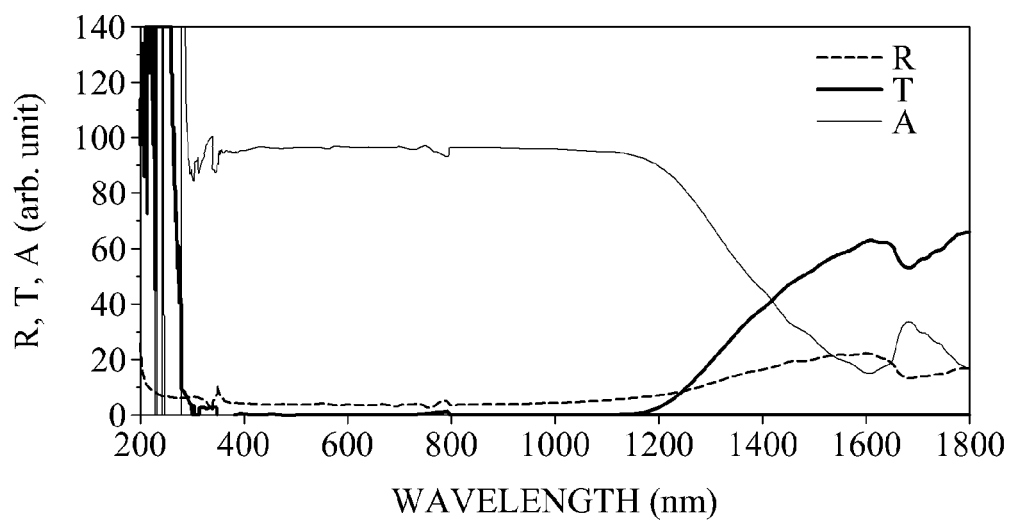

Reference will now be made in detail to example embodiments of the present invention, examples of which are illustrated in the accompanying drawings, wherein like reference numerals refer to the like elements throughout. Example embodiments are described below to explain the present invention by referring to the figures.

Example embodiments of the present invention relate to a coating thickness measurement apparatus that may select a wavelength of a laser, which will be described in detail with reference to the accompanying drawings.

FIGS. 1A through 1D illustrate reflection (R) spectrums, transmission (T) spectrums, and absorption (A) spectrums of main colors of a coating, for example, white, black, red, and blue, respectively, according to an embodiment of the present invention. The A and R spectrums may be used to select a wavelength of a pulsed laser and a CW laser, respectively. Referring to FIGS. 1A through 1D, a wavelength band having a relatively high absorptivity and a relatively high reflectivity may be changed based on a color of the coating.

Figure 2:
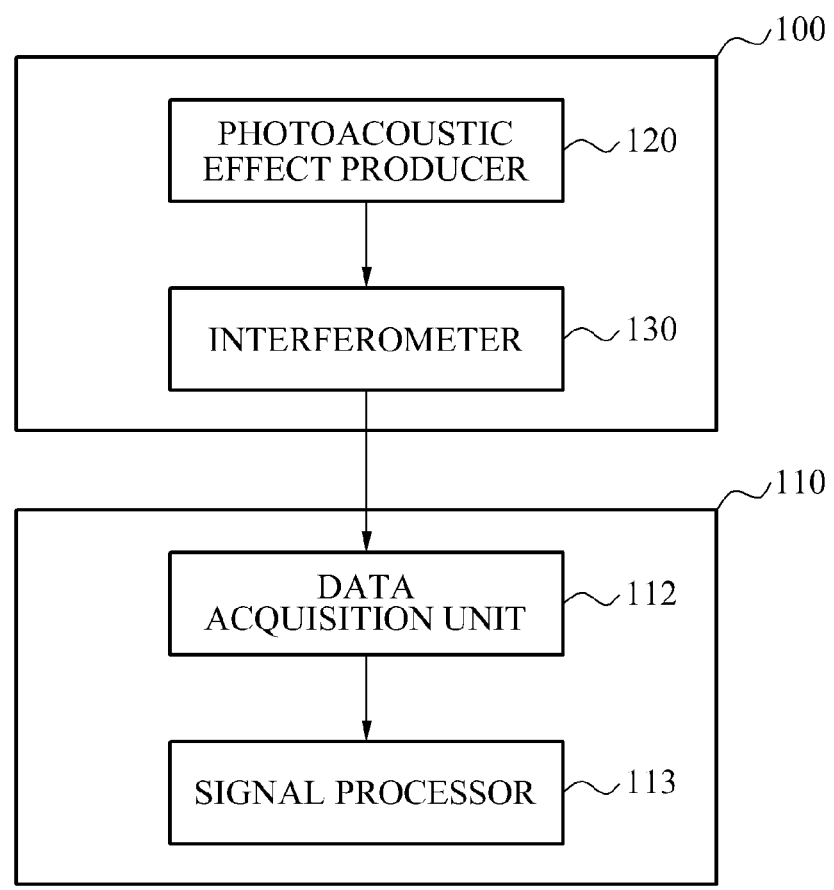
FIG. 2 is a block diagram illustrating a wavelength-selectable coating thickness measurement apparatus according to an embodiment of the present invention.

FIG. 2 is a block diagram illustrating a wavelength-selectable coating thickness measurement apparatus according to an embodiment of the present invention.

Referring to FIG. 2, the wavelength-selectable coating thickness measurement apparatus may include an optical unit 100 and signal processing unit 110.

The optical unit 100 may include a photoacoustic effect producer 120 and an interferometer 130. The photoacoustic effect producer 120 may produce a photoacoustic effect by generating an ultrasonic wave using a pulsed laser (not shown). The interferometer 130 may measure an optical interference signal changed when the generated ultrasonic wave is propagated into a coating and reaches a surface of the coating.

The signal processing unit 110 may include a data acquisition unit 112 and a signal processor 113. The data acquisition unit 112 may acquire the optical interference signal measured by the interferometer 130. The signal processor 113 may process the acquired optical interference signal and convert the optical interference signal into a thickness.

Figure 3:
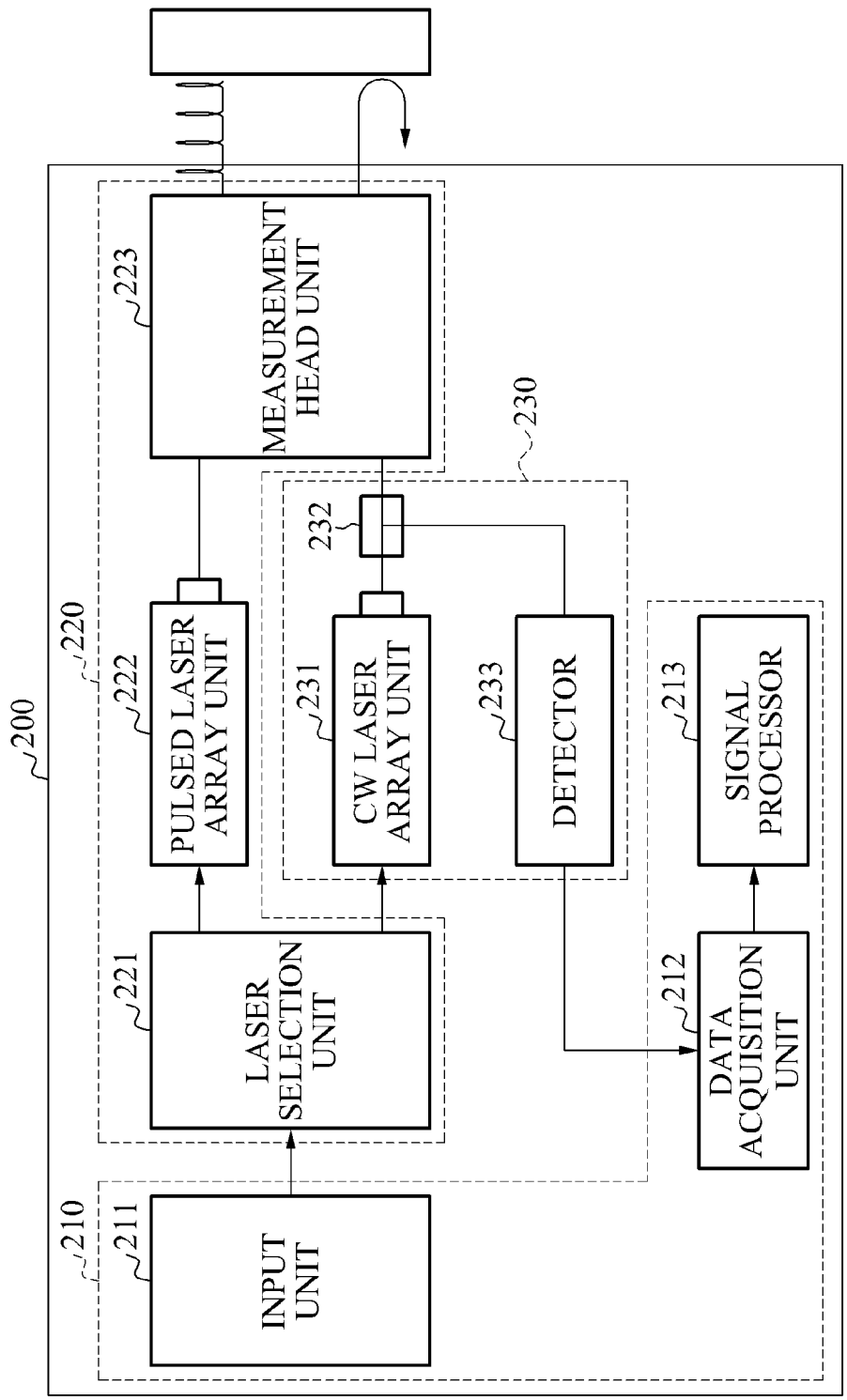
FIG. 3 is a block diagram illustrating an example of a wavelength-selectable coating thickness measurement apparatus according to an embodiment of the present invention.

FIG. 3 is a block diagram illustrating an example of a wavelength-selectable coating thickness measurement apparatus 200 according to an embodiment of the present invention.

FIG. 3 illustrates an example of the wavelength-selectable coating thickness measurement apparatus of FIG. 2.

Referring to FIG. 3, the wavelength-selectable coating thickness measurement apparatus 200 may include a signal processing unit 210 to receive data acquired through an interferometer 230 and process the acquired data, a photoacoustic effect producer 220 to produce a photoacoustic effect, for example, to generate an ultrasonic wave using a pulsed laser, and the interferometer 230 to measure an optical interference signal changed when the ultrasonic wave is propagated into a coating and reaches a surface of the coating.

In detail, the photoacoustic effect producer 220 may receive a signal selected by a user from an input unit 211. The selected signal may correspond to a selection of a color of the coating. A laser selection unit 221 may select lasers having suitable wavelengths based on the color of the coating. The laser selection unit 221 may control a pulsed laser array unit 222 and a CW laser array unit 231 to select lasers of wavelengths suitable for the color of the coating. A selected pulsed laser may be irradiated toward the coating through a measurement head unit 223. A selected CW laser may pass through a circulator 232 to be irradiated toward the coating through the measurement head unit 223. Waves reflected by the coating may be received through the measurement head unit 223. The received waves may pass through the circulator 232, and be detected by a detector 223. Detected signals may be transferred to a data acquisition unit 212. A signal processor 213 may convert a signal received from the data acquisition unit 212 into a thickness. The signal received from the data acquisition unit 212 may correspond to an optical interference signal generated when the CW laser reflected after irradiation toward the coating is changed due to an effect of an ultrasonic wave generated by the pulsed laser.

Figure 4:
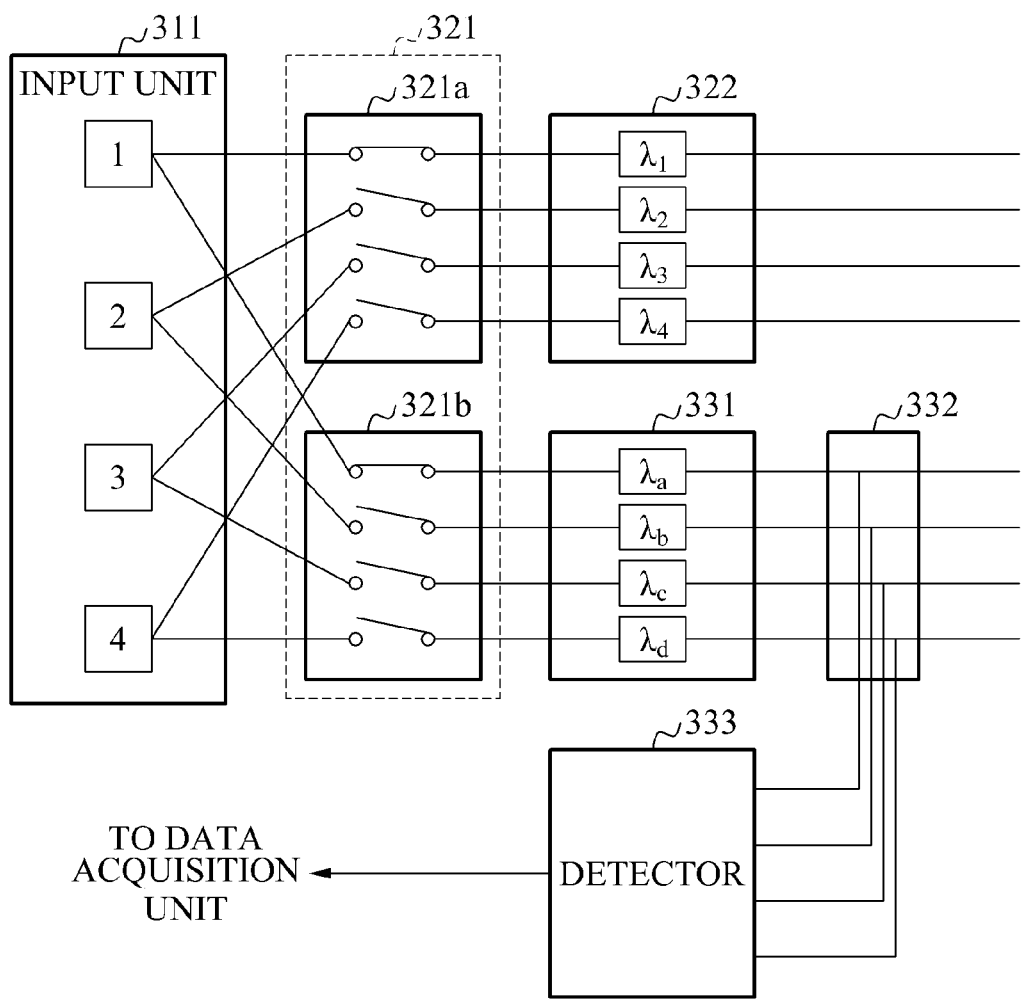
FIG. 4 is a diagram illustrating a laser selection unit and an interferometer according to an embodiment of the present invention.

FIG. 4 is a diagram illustrating the photoacoustic effect producer 220 and the interferometer 230 of FIG. 3.

Referring to FIG. 4, a pulsed laser and a CW laser having different wavelengths may be selected and operated based on a color of a coating. A pulsed laser array unit 322 and a CW laser array unit 331 may include pulsed lasers $\lambda_1, \lambda_2, \lambda_3$, and $\lambda_4$, and CW lasers $\lambda_a, \lambda_b, \lambda_c$, and $\lambda_d$, respectively. The pulsed lasers $\lambda_1, \lambda_2, \lambda_3$, and $\lambda_4$ and the CW lasers $\lambda_a, \lambda_b, \lambda_c$, and $\lambda_d$ may have different wavelengths. The pulsed lasers may have wavelength bands with relatively excellent absorptivities with respect to four main colors of a coating to be measured. The CW lasers may have the wavelength bands with relatively excellent reflectivities with respect to the four main colors of the coating to be measured.

When a color of the coating, for example, a wavelength of a laser, is selected by a coating thickness measurement apparatus (for example, when a first button of an input unit 311 is selected), a pulsed laser may be switched to a pulsed laser beam (for example, $\lambda_1$) having a wavelength with a most excellent absorptivity with respect to the selected color of the coating, and a CW laser may be switched to a CW laser beam (for example, $\lambda_a$) having a wavelength with a most excellent reflectivity with respect to the selected color of the coating. As described above, a pulsed laser and a CW laser having at least one wavelength may be selectively output through the pulsed laser array unit 322 and the CW laser array unit 331. A laser selection unit 321 may enable a single-wavelength pulsed laser and a single-wavelength CW laser to be output based on a user input provided through the input unit 311, and switch to and operate a pulsed laser and a CW laser suitable for the color of the coating to be measured using switches 321a and 321b. The CW laser reflected after irradiation toward the coating may be detected by a detector 333, and detected signals may be transferred to a data acquisition unit (not shown).

In another example, by replacing a sensor head unit including a single pulsed laser and a single CW laser based on the color of the coating, wavelengths of the pulsed laser and the CW laser may be selectively changed based on the color of the coating.

According to example embodiments of the present invention, a coating thickness measurement apparatus may support a contactless manner using light. The coating thickness measurement apparatus may include pulsed lasers and CW lasers having different wavelengths, and select a pulsed laser and a CW laser having a wavelength that may produce a photoacoustic effect and that may generate an interference signal based on a color of a coating, respectively. Thus, thicknesses of coatings in various colors may be precisely measured using a single coating thickness measurement apparatus.

A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A coating thickness measurement apparatus comprising:
   a pulsed laser source to irradiate a pulsed laser beam toward a coating;
   a continuous wave (CW) laser source to irradiate a CW laser beam toward the coating;
   a detector to detect an optical interference signal corresponding to the CW laser beam; and
   a signal processor to process the optical interference signal to calculate a thickness of the coating;
   wherein a wavelength of the pulsed laser source is selectable based on an absorptivity of the wavelength of the pulsed laser source with respect to a color of the coating, and a wavelength of the CW laser source is selectable based on a reflectivity of the wavelength of the CW laser source with respect to the color of the coating.

2. The apparatus of claim 1, wherein the optical interference signal is changed due to an effect of a surface of the coating displaced by the pulsed laser beam.

3. The apparatus of claim 1, wherein the detector detects the optical interference signal in a vicinity of a surface of the coating.

4. The apparatus of claim 1, further comprising:
   an output unit to display the calculated thickness of the coating.

5. The apparatus of claim 1, further comprising:
   a laser controller to control the wavelength of the pulsed laser source and the wavelength of the CW laser source to be selectively switched based on color information of the coating input by a user.

6. The apparatus of claim 5, wherein the laser controller controls the wavelength of the pulsed laser source based on an absorptivity of the color information of the coating, and controls the wavelength of the CW laser source based on a reflectivity of the color information of the coating.

7. The apparatus of claim 1, wherein the pulsed laser source and the CW laser source further comprise a laser array, respectively, comprising at least two lasers to irradiate the pulsed laser beam and the CW laser beam having at least two wavelengths toward the coating.

8. The apparatus of claim 1, wherein the coating thickness measurement apparatus operates in a contactless manner.

9. The apparatus of claim 1, wherein the pulsed laser source and the CW laser source are configured to be a single sensor head unit, and the sensor head unit is replaceable.

10. The apparatus of claim 1, wherein the pulsed laser source comprises a plurality of pulsed lasers each having a wavelength different from others of the plurality of pulsed lasers, and the CW laser source comprises a plurality of CW lasers each having a wavelength different from others of the plurality of CW lasers, the wavelength of each of the plurality of pulsed lasers and the wavelength of each of the plurality of CW lasers being independently selectable based on at least one input corresponding to at least one of a plurality of main colors.

* * * * *